(12) United States Patent
Probst et al.

(10) Patent No.: US 7,005,470 B2
(45) Date of Patent: Feb. 28, 2006

(54) AQUEOUS 2K PUR SYSTEMS

(75) Inventors: Joachim Probst, Köln (DE); Martin Melchiors, Leichlingen (DE); Gerhard Ruttmann, Burscheid (DE); Thomas Stingl, Montabaur (DE); Hartmut Ottensmann, Düsseldorf (DE)

(73) Assignee: Bayer Aktiengesellschaft, Leverkusen (DE)

( * ) Notice: Subject to any disclaimer, the term of this patent is extended or adjusted under 35 U.S.C. 154(b) by 309 days.

(21) Appl. No.: 10/393,588

(22) Filed: Mar. 21, 2003

(65) Prior Publication Data

US 2003/0187134 A1 Oct. 2, 2003

(30) Foreign Application Priority Data

Mar. 25, 2002 (DE) ............... 102 13 229

(51) Int. Cl.
*C08J 3/00* (2006.01)
*C08K 3/20* (2006.01)
*C08L 75/00* (2006.01)
*B05D 3/00* (2006.01)
*B32B 27/00* (2006.01)

(52) U.S. Cl. ............ 524/507; 427/372.2; 427/385.5; 428/423.1; 524/589; 524/590; 524/591; 524/839; 524/840; 525/123; 525/455

(58) Field of Classification Search ........ 524/507, 524/589, 590, 591, 839, 840; 525/123, 455; 427/372.2, 385.5; 428/423.1
See application file for complete search history.

(56) References Cited

U.S. PATENT DOCUMENTS

| | | | |
|---|---|---|---|
| 5,075,370 A | 12/1991 | Kubitza et al. | 524/591 |
| 5,304,400 A | 4/1994 | Dhein et al. | 427/388.4 |
| 5,750,613 A | 5/1998 | Blum et al. | 524/457 |
| 6,017,998 A | 1/2000 | Duan et al. | 524/591 |
| 6,376,602 B1 | 4/2002 | Probst et al. | 524/591 |
| 6,399,718 B1 | 6/2002 | Rink et al. | 525/452 |
| 6,420,478 B1 | 7/2002 | Irle et al. | 524/591 |
| 6,528,573 B1 | 3/2003 | Probst et al. | 524/507 |
| 6,590,028 B1 * | 7/2003 | Probst et al. | 524/589 |
| 2001/0040008 A1 | 11/2001 | Bauriedel et al. | 156/327 |
| 2002/0143101 A1 | 10/2002 | Probst et al. | 524/589 |

FOREIGN PATENT DOCUMENTS

| | | | |
|---|---|---|---|
| DE | 100 06 539 | | 8/2001 |
| WO | 99/21904 | | 5/1999 |
| WO | WO 00/37521 | * | 6/2000 |
| WO | 02/31021 | | 4/2002 |

* cited by examiner

Primary Examiner—Patrick D. Niland
(74) Attorney, Agent, or Firm—Joseph C. Gil; Thomas W. Roy

(57) ABSTRACT

The invention relates to aqueous two-component polyurethane systems comprising vinyl polymer polyol dispersions modified with reactive diluents, to a process for preparing them and to use as coating materials.

11 Claims, No Drawings

AQUEOUS 2K PUR SYSTEMS

BACKGROUND OF THE INVENTION

The invention relates to aqueous two-component polyurethane systems comprising vinyl polymer polyol dispersions modified with reactive diluents, to a process for preparing them and to use as coating materials.

Aqueous two-component (2K) polyurethane (PUR) systems have been described in the prior art, for example in EP-A 0 358 979, EP-A 0 496 210 and EP-A 0 557 844. Both so-called secondary dispersions and so-called primary dispersions are employed as polyol components, and are combined with appropriate polyisocyanates.

"Secondary dispersions" are those aqueous dispersions which are first polymerized in a homogeneous organic medium and then redispersed in an aqueous medium with neutralization, generally without the addition of external emulsifiers.

"Primary dispersions" are polyol dispersions which are prepared directly in aqueous phase by the technique of emulsion polymerization. In this kind of technique the use of external emulsifiers which bring about electrostatic or steric stabilization is generally necessary.

Highly suitable as rapidly physically drying aqueous 2K PUR systems are, for example, those which comprise primary dispersions as polyol components. These polyol components have molar weight values of $M_n$ significantly greater the 5000 g/mol and $M_w$ values of generally greater than 30 000 g/mol. These primary dispersions can generally be combined only with hydrophilicized or partially hydrophilicized polyisocyanates, thereby allowing relatively uncomplicated dispersion with relatively simple stirring assemblies or by hand and glass rod (see, e.g., EP-A 0 557 844). Additionally, such aqueous 2K PUR systems customarily include relatively high concentrations of organic cosolvents, which act as coalescence aids when a film is formed on a substrate. When such aqueous, cosolvent-containing 2K PUR systems are applied as coatings, for example to mineral substrates, such as floors, for example, coatings are obtained which exhibit very good levelling, relatively high gloss levels and low haze values, but the volatile organic compounds (VOCs) have a severely adverse effect on the environment and may even be a hygiene burden.

Oligoether or polyether polyols are likewise known from the prior art as what are termed reactive diluents in aqueous vinyl polymer dispersions. For example, EP-A 0 557 844 describes how the polyvinyl polyol dispersions of the primary dispersion type which are used there in an aqueous 2K PUR system may further comprise up to 10% by weight, based on the overall weight of the polymer resins, of water-soluble polyhydric alcohols such as, for example, ethylene glycol, propylene glycol, glycerol, trimethylolpropane or the low molecular weight, water-soluble alkoxylation products of such polyhydric alcohols.

EP-A 0 758 007 discloses aqueous crosslinkable binder dispersions A) of low solvent content which comprise at least one hydroxy-functional polyether A1) and a hydroxy-functional vinyl polymer resin synthesized in two stages from a relatively hydrophobic component A2) and a relatively hydrophilic component A3). These hydroxy-functional vinyl polymers are secondary dispersions, which are prepared by free-radical polymerization in a homogeneous organic medium in the presence of low molecular weight volatile solvents and the hydroxy-functional polyethers A1) mentioned and are then dispersed in an aqueous phase together with neutralizing agents. Although it is possible in principle to remove the organic cosolvents from these binder dispersions by distillation, the additional use of cosolvents in the binder/crosslinker systems as auxiliaries for better compatibility of the components (binder and crosslinker) and also for better film formation, is regarded as being unavoidable.

It was therefore an object of the present invention to provide polyol dispersions as binders for aqueous 2K PUR systems where there is no need to add cosolvents and which can be used as coating materials for any desired substrates.

DESCRIPTION OF THE INVENTION

It has surprisingly been found that when using hydroxy-functional vinyl polymers of the primary dispersion type together with hydroxyl-functional, hydrophobic, i.e. water-insoluble, polyethers and non-blocked polyisocyanates as crosslinkers, it is no longer necessary to have volatile cosolvents in aqueous 2K PUR systems in order to provide good compatibility between the polyol component and the polyisocyanate component or to provide excellent film formation following application of the 2K PUR system.

The invention provides a process for preparing aqueous two-component polyurethane systems, comprising i) preparing a polyol component a) composed of a hydrophobic core polymer having a glass transition temperature of 40° to 100° C., preferably from 40° to 80° C., on which a hydrophilic shell polymer having a glass transition temperature of from −100° to +25° C., preferably from −50° to +20° C., has been grafted by aqueous-phase emulsion polymerization, ii) adding a hydroxyl-containing polyether component b) before, during or after the polymerization of component a) and iii) admixing a polyisocyanate component c) therewith.

In the process of the invention it is preferred not to add any cosolvent.

The polyol component a) comprises hydroxy-functional copolymers with hydroxyl numbers in the range from 10 to 264 mg KOH/g resin solids, preferably from 30 to 150 mg KOH/g resin solids, and with acid numbers in the range from 3 to 55 mg KOH/g resin solids, preferably from 4 to 30 mg KOH/g resin solids, the acid number relating both to free, non-neutralized acid groups and to acid groups present in neutralized form. Suitable acid groups are, for example, carboxyl and/or sulphonic acid groups. Preference is given to carboxyl and/or carboxylate group. The amount of chemically bonded carboxylate and/or sulphonate group is in the range from 5 to 98, preferably from 7 to 53, milliequivalents per 100 g solids.

The polyol component a) generally has a molecular weight $M_n$, determinable by the method of gel permeation chromatography using polystyrene as standard, of from 5,00 to 300,000, preferably from 10,000 to 200,000, and a molecular weight $M_w$ of from 30,000 to 2,000,000, preferably from 40,000 to 500,000, g/mol. These molar weight determinations take no account of crosslinked polymer fractions, e.g. microgels.

The polyol component a) is prepared from

A) from 0.5 to 7% by weight, preferably from 0.5 to 5% by weight, and most preferably from 0.7 to 3.0% by weight, of a monomer selected from the group consisting of acrylic acid, methacrylic acid, and mixtures thereof, B) from 5 to 75% by weight, preferably from 20 to 70% by weight, and most preferably from 30 to 60% by weight, of a monomer selected from the group consisting of methyl methacrylate, styrene, and mixtures thereof C) from 3 to 40% by weight, preferably from 10 to 40% by weight, and most preferably from 20 to 30% by weight, of a monomer selected from the group consisting of $C_{1-8}$ alkyl acrylates, $C_{2-8}$ alkyl methacrylates, and mixtures thereof, D) from 2 to 74% by weight, preferably from 5 to 50% by weight, and most preferably from 10 to 30% by weight, of a monomer selected from the group consisting of monohydroxy-functional alkyl acrylates, monohydroxy-functional alkyl methacrylates, and mixtures thereof, E) from 0 to 30% by weight, preferably from 0 to 15% by weight, and most preferably 0% by weight, of other olefinically unsaturated monomers, the sum of the components being 100% by weight.

Suitable $C_{1-8}$ alkyl acrylates C) include, for example, methyl acrylate, ethyl acrylate, n-propyl acrylate, iso-propyl acrylate, n-butyl acrylate, iso-butyl acrylate, tert-butyl acrylate, n-hexyl acrylate, n-octyl acrylate or 2-ethylhexyl acrylate. Preference is given to n-butyl acrylate, n-hexyl acrylate, and 2-ethylhexyl acrylate, with n-butyl and/or 2-ethylhexyl acrylate being most preferred.

Suitable $C_{2-8}$ alkyl methacrylates C) include, for example, ethyl methacrylate, n-butyl methacrylate and/or 2-ethylhexyl methacrylate.

Suitable hydroxyl-functional (meth)acrylates D) include, for example, 2-hydroxyethyl (meth)acrylate, 2-hydroxypropyl (meth)acrylate, 2-hydroxyisopropyl (meth)acrylate, 4-hydroxybutyl (meth)acrylate or any desired mixtures of these monomers, with 2-hydroxyethyl methacrylate and the technical-grade mixture of 2-hydroxypropyl and 2-hydroxyisopropyl methacrylates (referred to generally as hydroxypropyl methacrylate) being most preferred.

The other monomer units, E), may be substituted styrene derivatives, such as, for example, the isomeric vinyltoluenes, α-methylstyrene, propenylbenzene, $C_5$–$C_{12}$ cycloalkyl (meth)acrylates, isobornyl (meth)acrylate, vinyl esters such as vinyl acetate, propionate or versatate or vinylsulphonic acid.

The preparation of the polyol component a) takes place directly in aqueous phase by the technique of emulsion polymerization, which is known in principle and is summarized, for example, in B. Vollmert, "Grundriss der Makromolekularen Chemie", volume 1, p.181 ff., Vollmert Verlag 1988, Karlsruhe, or in H. G. Elias, "Makromoleküle", vol. 2, p. 93 ff., Hüthig & Wepf Verlag Basel, Heidelberg, N.Y. 1992.

Examples of suitable free-radical initiators include peroxodisulphates, such as potassium or ammonium peroxodisulphate. It is, however, also possible to use redox systems such as, for example, ammonium peroxodisulphate/sodium hydroxymethanesulphinate (Rongalit®C, BASF AG, Ludwigshafen)/iron sulphate or t-butyl hydroperoxide/Rongalit®C/iron sulphate as free-radical initiators.

In the preparation of polyol component a) in accordance with the principle of emulsion polymerization it is also possible to use external emulsifiers as well, such as, for example, anionic emulsifiers, examples being those based on alkyl sulphate, alkylarylsulphonates, alkylphenol polyether sulphates, as specified, for example, in Houben-Weyl, Methoden der organischen Chemie, Erweiterungs- und Folgebände, 4th edition, volume E 20,1987 (part 1, pages 259 to 262) or alkyl polyether sulphates, sulphosuccinates or non-ionic emulsifiers, such as, for example, the alkoxylation, especially ethoxylation, products of alkanols, phenols or fatty acids, which remain in the 2K PUR system of the invention following the preparation of the polyol component a) and which may be regarded as auxiliaries and additives d).

Where emulsifiers of this kind are present it is often sufficient to neutralize just a very small proportion of the acid groups present in order to ensure the homogeneity of the solutions or dispersions of the polyol component a). The neutralizing agents which are nevertheless used, at least at a low concentration, may be incorporated into the system as early as during the emulsion polymerization. In the case of low concentrations of saltlike groups, therefore, the solubility or dispersibility of the polyol component a) in water may be facilitated by concomitant use of external emulsifiers. In any case it is necessary to ensure the dilutability of the copolymers in water in the form either of a dispersion or of a colloidally to molecularly disperse "solution".

The process for the preparation of polymer polyol components a) takes place in at least two stages. In the first polymerization stage a free-radically initiated polymerization produces a relatively hard polymer, i.e. a polymer having a glass transition temperature of from 40° to 100° C., preferably from 40° to 80° C., as a graft base onto which, in a second polymerization stage, a relatively soft polymer, i.e. a polymer having a glass transition temperature of from −100° to +25° C., preferably from −50° to +20° C., is grafted as a graft, in analogy for example to DE-A 19 858 732, p. 3, line 30. In this context both the first polymerization stage and the second, grafting stage may be conducted using relatively hydrophilic monomer mixtures (i.e. with comonomers containing acid groups).

Preference, however, is given to a process in which, in the aqueous phase, first a relatively hydrophobic, hard polymer is prepared by free-radically initiated polymerization in the presence of an external emulsifier, the resulting polymer containing no acid groups and serving as a graft base onto which, in a second, subsequent polymerization stage, a more hydrophilic, softer stage containing carboxyl groups is grafted.

Also possible are a plurality of polymerization stages which take place in series and lead to polymers which are more and more hydrophilic and increasingly softer. Possible as well, of course, is what is known as a gradient procedure, in which the hydrophilicity and the polymer hardness (measured by means of the glass transition temperature) are altered continuously in the course of the feed process, as described, for example, in WO-A 98/12230 on p. 8, lines 25 et seq.

The acids (either from component A) or component E)), in copolymerized form, are at least partly neutralized after the end of polymerization, so that the resulting anionic groups ensure the solubility or dispersibility of the polyol component a) in water. From 5 to 100% of the acid groups present in copolymerized form should be present in a form in which they have been neutralized with aliphatic amines or with ammonia.

Compounds suitable for the at least partial neutralization of the acid groups present in copolymerized form include ammonia or aliphatic amines such as, for example, triethylamine, dimethylethanolamine, diethylethanolamine, triethanolamine or any other aliphatic amines with molecular weights in the range from 31 to 200 g/mol, with ammonia, triethylamine or dimethylethanolamine being preferred.

Ideally, the ultimate product is a core-shell polymer having a hydrophobic, relatively hard core and a hydrophilic, relatively soft shell.

The polyol component a) in aqueous phase generally has solids contents of from 20 to 60% by weight, preferably from 30 to 50% by weight, pH values from 6 to 10, preferably from 6.5 to 8.5, viscosities of from 5 to 5000 mPas, preferably from 5 to 2000 mPas (measured at 23° C. and a shear rate of 45.4 $s^{-1}$) and average particle diameters of from 50 to 300 nm, preferably from 70 to 200 nm (measured by laser correlation spectroscopy).

Suitable hydroxy-functional polyethers b) have average OH functionalities of from 1.8 to 6.0 (preferably from 2.0 to 4.0), OH numbers from 50 to 700 (preferably from 100 to 600 mg KOH/g solids), and molecular weights $M_n$ of from 106 to 4000 g/mol (preferably from 200 to 3500), and include, for example, alkoxylation products of hydroxy-functional precursor molecules such as ethylene glycol, propylene glycol, butanediol, hexanediol, trimethylolpropane, glycerol, pentaerythritol, sorbitol or mixtures of these and also other hydroxy-functional compounds with propylene oxide or butylene oxide. Polypropylene oxide polyols having a molecular weight of from 300 to 4000 g/mol are preferred. In this case the particularly low molecular weight polyether polyols may be soluble in water at appropriately high OH contents. Particular preference, however, is given to water-insoluble polypropylene oxide polyols.

The polyisocyanate component c) has a viscosity of from 5 to 12 000 mPas, preferably from 50 to 10,000 mPas, and may be either c1) hydrophobic, non-hydrophilicized or
c2) hydrophilicized.

Where a non-hydrophilicized, water-insoluble or non-water-dispersible polyisocyanate component c1) is used in the process of the invention, an effective dispersing action is possible only by means of a highly effective dispersing assembly, e.g. using a nozzle jet disperser in accordance with EP-A 0 685 544. With such a disperser, after the film has been applied, the maximum possible chemical resistances and water resistance of the 2K PUR system are achieved.

However, where the polyisocyanate component c) is to be effectively dispersed with simpler dispersing assemblies such as, for example, a dissolver or possibly even manually in finely divided form, with the polyol components a) and b), nonionic or anionic hydrophilicization of c) is necessity. The use of hydrophilicized polyisocyanates c2) or of mixtures of c1) with c2) with good dispersibility in the aqueous phase is therefore preferred.

Polyisocyanates suitable as component c) are, in particular, the "paint polyisocyanates", as they are known, having aromatically, aliphatically or cycloaliphatically attached isocyanate groups, preference being given to the aliphatic or cycloaliphatic polyisocyanates.

Examples of preferred polyisocyanates c) suitably include "paint polyisocyanates" based on hexamethylene diisocyanate or on 1-isocyanato-3,3,5-trimethyl-5-isocyanatomethyl-cyclohexane (IPDI) and/or bis(isocyanatocyclohexyl)methane, particularly those which are based exclusively on hexamethylene diisocyanate.

By "paint polyisocyanates" based on these diisocyanates are meant the conventional derivatives of these diisocyanates that contain biuret, urethane, uretdione, allophanate and/or isocyanurate groups and have been freed from excess starting diisocyanate following their preparation, down to a residual content of less than 0.5% by weight, in a known manner, preferably by distillation. Preferred aliphatic polyisocyanates are polyisocyanates which contain biuret groups and are based on hexamethylene diisocyanate, consisting of mixtures of N,N',N''-tris(6-isocyanatohexyl)biuret with minor amounts of its higher homologues, and also the cyclic trimers of hexamethylene diisocyanate which meet the criteria specified and consist essentially of N,N',N''-tris(6-isocyanatohexyl) isocyanurate in a mixture with minor amounts of its higher homologues. Particular preference is given to corresponding mixtures of polyisocyanates based on hexamethylene diisocyanate and containing uretdione and/or isocyanurate groups, such as are formed by catalytic oligomerization of hexamethylene diisocyanate using trialkylphosphines. Very particular preference is given to the last-mentioned mixtures with a viscosity at 23° C. of 50 to 500 mPas and an NCO functionality of between 2.2 and 5.0. Also possible, however, is the use of monomeric polyisocyanates such as 4-isocyanatomethyloctane 1,8-diisocyanate, for example.

Likewise suitable are the "paint polyisocyanates" based on 2,4-diisocyanatotoluene or its technical-grade mixtures of 2,6-diisocyanatotoluene or based on 4,4'-diisocyanatodiphenylmethane or its mixtures with its isomers and/or higher homologues. Examples of aromatic paint polyisocyanates of this kind are the isocyanates containing urethane groups, such as are obtained by reacting excess amounts of 2,4-diisocyantotoluene with polyhydric alcohols such as trimethylolpropane followed by distillative removal of the unreacted diisocyanate excess. Further aromatic paint polyisocyanates are, for example, the trimers of the monomeric diisocyanates exemplified, i.e. the corresponding isocyanato isocyanurates, which likewise following their preparation have been freed preferably by distillation from excess monomeric diisocyanates.

In principle it is also possible to use unmodified polyisocyanates of the kind exemplified, provided that they comply with the remarks made in respect to viscosity.

The polyisocyanate component c) may be composed, moreover, of any desired mixtures of the polyisocyanates exemplified.

Preference is given to using hydrophilicized polyisocyanates c2) which may be prepared by nonionic and/or anionic hydrophilicization of the abovementioned hydrophobic polyisocyanates.

The nonionic hydrophilicization of the polyisocyanate component c) takes place in general by modifying an unmodified hydrophobic polyisocyanate with a polyether monoalcohol in accordance, for example, with EP-A 0 540 985, p. 3 line 55–p. 4 line 5 and EP-A 0 959 087, p. 3 lines 39–51.

Anionic hydrophilicization of component c) may take place by means of phosphate, sulphate or sulphonate groups. It is preferred here to use sulphonate groups, which are present in the polyisocyanate in chemically bonded form. They may be prepared, for example, by reacting polyisocyanates with sulphonate-functional compounds which in addition carry at least one group which is reactive towards NCO groups. By way of example of such compounds, mention may be made of reaction products of polyisocyanates with 3-(cyclohexylamino)propanesulphonic acid. The sulphonic acid and/or sulphonate groups may be present in amounts of from 0.1 to 5.0% by weight, based on the polyisocyanate.

It is also possible in principle to use polyisocyanates with mixed hydrophilicization, as are described, for example, in EP-A 0 510 438, p. 2 line 56–p. 3 line 5. In this case hydrophilicization with nonionic polyether groups takes place simultaneously with anionic or potentially, i.e. to form a group capable of forming an ionic group, preferably with anionic carboxyl groups.

Examples of suitable auxiliaries and additives d) include pigments, fillers, levelling agents, thickeners, defoamers, devolatilizers and the like.

The aqueous two-component polyurethane systems of the invention are generally prepared simply by stirring the individual components a), b) and c) together manually or by subjecting them to the action of a stirrer or where appropriate, in the case of 2K systems which are difficult to disperse, with a nozzle jet disperser, the proportions being chosen so as to give NCO/OH equivalents ratios of from 0.2:1 to 5:1, preferably from 0.7:1 to 3:1.

It is possible in principle here to add the hydroxyl-containing polyether component b) even before or during polymerization of a). Where component b) is incorporated into the polyol component a) before polymerization, the addition is made, in the case of emulsion polymerization, to the aqueous initial charge, together where appropriate with an anionic emulsifier.

Component a) is preferably combined with from 1.0 to 30.0% by weight of the hydroxy-functional polyether b) as reactive diluent.

In one preferred embodiment of the process of the invention the polyether component b) is used during the feed polymerization of a), which is then followed by the addition to the inflowing monomer mixture or, in the case of sufficient solubility or dispersibility in water, to the aqueous inflowing initiator solution. It is particularly preferred to use the polyether component b) in the monomer feed during the preparation of the graft of the graft polymer described above.

Also possible in principle is the addition of the polyether component b) to the polyol component a) when polymerization is over, for example during neutralization. This process variant only makes sense, however, when the two polyol components a) and b) are highly compatible with one another, since in that case they constitute straight mixtures of a) and b).

Compatibility between the polyisocyanate component c) and the sum of the polyol components a) and b), and hence also readier dispersibility of the aqueous 2K PUR system prepared from these components, is enhanced considerably if the polyisocyanate component c) has been either nonionically or anionically hydrophilicized. It is therefore preferred to carry out dispersion manually or with simple stirring assemblies, such as a dissolver, for example.

The present invention also provides aqueous two-component polyurethane systems obtained by the process of the invention.

In order to prepare coating compositions it is possible where appropriate to incorporate further auxiliaries and additives d) of coatings technology into the aqueous 2K PUR systems of the invention. Such auxiliaries and additives d) also include, for example, further quantities of water for the purpose of adjusting the 2K PUR systems of the invention to the appropriate processing viscosity. The 2K PUR systems of the invention may thus be used as coating materials, such as paints or adhesives, for example.

The present invention likewise provides coating compositions comprising the aqueous 2K PUR systems of the invention.

In the process of the invention, no organic solvents are added with the resin component or curing component or in the coating formulation. Nevertheless, a number of commercially customary coatings auxiliaries and additives are supplied as solutions in organic solvents, so that small amounts of organic cosolvents may be introduced into the coating materials if such additives are used. The aqueous coating compositions of the invention may therefore, where appropriate, contain less than 2% by weight, preferably less than 1% by weight, with particular preference less than 0.5% by weight, of organic cosolvents.

The coating compositions comprising the 2K PUR systems of the invention may be applied by all standard industry methods such as spraying, dipping or brushing, for example, to any desired substrates, such as wood, metal, plastic and mineral substrates, for example, and also of synthetic-resin coatings based on EP and PU, and can be dried at temperatures from 0° C. to 180° C. Preference is given to curing temperatures of between 15° C. and 80° C.

The present invention additionally provides a process for producing coated substrates, characterized in that the 2K PUR systems of the invention are used as coating compositions. Preferred substrates in this case are mineral substrates and also synthetic-resin coatings based on EP and PU. In this context, the particularly high resistance of the cured coatings to aqueous chemicals can be observed.

Likewise provided by the present invention are substrates coated with coating compositions comprising the aqueous two-component polyurethanes systems of the invention.

The acid numbers found experimentally are generally markedly higher than the theoretical values corresponding to the above incorporation conditions. This can be attributed both to hydrolytic events and to ionic groups of the emulsifiers and initiator fragments.

The invention is further illustrated but is not intended to be limited by the following examples in which all parts and percentages are by weight unless otherwise specified.

EXAMPLES

Polyisocyanate 1

Hydrophilicized polyisocyanate containing isocyanurate, urethane and allophanate groups and based on 1,6-diisocyanatohexane (HDI), having an NCO content of 16.2% and a viscosity (23° C., 100% form) of 6800 mPa*s (Bayhydur® VP LS 2336, Bayer AG, Leverkusen, Del.).

Polyisocyanate 2

Hydrophilicized polyisocyanate containing isocyanurate, urethane and allophanate groups and based on 1,6-diisocyanatohexane (HDI), having an NCO content of 18.1% and a viscosity (23° C., 100% form) of 4500 mPa*s (Bayhydur® VP LS 2319, Bayer AG, Leverkusen, Del.).

Polyisocyanate 3

Hydrophilicized polyisocyanate containing isocyanurate and urethane groups and based on 1,6-diisocyanatohexane (HDI), having an NCO content of 17.3% and a viscosity (23° C., 100% form) of 3000 mPa*s (Bayhydur® XP 7063, Bayer Corp., U.S.A.).

Polymer Polyol 1 (Comparative Example with Core/Shell Structure but without Polyether Polyol)

A 3 l glass reactor with effective paddle stirrer, gas inlet and gas outlet, a reflux condenser and a thermal conditioning apparatus which ensures an isothermal regime is charged with 12.5 g of an 80% by weight, aqueous paste of an emulsifier A (ammonium salt of the monoester of a $C_{12-18}$ fatty alcohol polyethylene oxide with a degree of polymerization of approximately 3; Emulgator 951, Bayer AG, Leverkusen, Del.) and 720 g of deionized water (solution I). After the mixture has been thoroughly purged with nitrogen, this initial charge is heated to a temperature of 80° C. During this time a continuous stream of nitrogen is maintained above the level of the liquid. Subsequently, mixture II and solution III are metered in over the course of approximately 5 minutes.

| II. | Hydroxypropyl methacrylate: | 8.3 g |
|---|---|---|
|  | Methyl methacrylate: | 30 g |
|  | Styrene: | 45 g |
|  | n-Butyl acrylate: | 14.7 g |
| III. | Ammonium peroxodisulphate: | 0.3 g |
|  | Deionized water: | 17 g |

After a reaction time of 30 minutes, during which a so-called "in situ" seed is produced, mixture IV is metered in over 2 hours and solution V over 4 hours, both below the level of the liquid, i.e. in the immersed state.

| IV. | Hydroxypropyl methacrylate: | 37.4 g |
|---|---|---|
|  | Methyl methacrylate: | 135.1 g |
|  | Styrene: | 202.6 g |
|  | n-Butyl acrylate: | 65.9 g |
| V. | Ammonium peroxodisulphate: | 3.0 g |
|  | Emulgator A (see above, 80% form): | 12.5 g |
|  | Deionized water: | 600 g |

Immediately after the end of the monomer stream IV, the metered addition of the monomer stream VI is commenced. This monomer stream is likewise metered in over 2 hours, so that the volume flows V and VI are both ended at the same time.

| VI. | Acrylic acid: | 10.0 g |
|---|---|---|
|  | Hydroxypropyl methacrylate: | 123.3 g |
|  | Methyl methacrylate: | 34.9 g |
|  | Styrene: | 52.4 g |
|  | n-Butyl acrylate: | 220.4 g |

Thereafter the mixture is stirred for 1 hour and subsequently reactivated with solution VII.

| VII. | Ammonium peroxodisulphate: | 1.0 g |
|---|---|---|
|  | Deionized water: | 10.0 g |

After 4 hours of subsequent stirring the mixture is cooled to room temperature and then neutralized with the mixture VIII.

| VIII. | Ammonia (25% strength aqueous solution): | 7.5 g |
|---|---|---|
|  | Deionized water: | 10.0 g |

(calculated degree of neutralization, based on the carboxyl groups: 79.4%)

The product is subsequently discharged and filtered.

The physicochemical properties of this dispersion are as follows:

| Solids content: | 42.0% by weight |
|---|---|
| pH: | 7.3 |
| Viscosity (23° C.; D = 42 s$^{-1}$): | <100 mPas |
| Average particle diameter (LCS): | 91 nm |
| Acid number: | 7.3 mg KOH/g dispersion |

Polymer Polyol 2 (Inventive)

The process described for the production of Polymer polyol 1 was followed exactly except that the following mixture VI was substituted for the mixture VI used in Example 1:

| VI. | Acrylic acid: | 10.0 g |
|---|---|---|
|  | Hydroxypropyl methacrylate: | 123.3 g |
|  | Methyl methacrylate: | 34.9 g |
|  | Styrene: | 52.4 g |
|  | n-Butyl acrylate: | 170.4 g |
|  | Polyether-Desmophen ® 550 U (Bayer AG, Leverkusen, DE): | 50.0 g |

(Polyether-Desmophen ® 550 U, Bayer AG, Leverkusen, DE is a polypropylene oxide based on trimethylolpropane as precursor, having an average molecular weight $M_n$ of 437 g/mol and an OH number of 385 mg KOH/g resin solids)

The degree of neutralization here is 100% based on the carboxyl groups).

The physicochemical properties of this dispersion are as follows:

| Solids content: | 41.8% by weight |
|---|---|
| pH: | 8.0 |
| Viscosity (shear gradient D = 45.4 s$^{-1}$; T = 23° C.): | 14 mPa*s |
| Average particle diameters (LCS): | 106 nm |
| Acid number: | 6.8 mg KOH/g dispersion |
| Glass transition temperature (DSG method): | 11.5° C./66.0° C. |

(i.e. 2 glass transitions are clearly evident)

Polymer Polyols, Examples 3–7 (Inventive)

A 3 l glass reactor with an effective paddle stirrer, gas inlet and gas outlet, a reflux condenser and a thermal conditioning apparatus which ensures an isothermal regime is charged with the solutions I (see Table 1) and purged thoroughly with nitrogen. Thereafter, the initial charge I is heated with stirring at approximately 200 rpm to a temperature of 80° C. During this time a continuous stream of nitrogen is maintained above the level of the liquid. Subsequently, the mixtures II and the solutions III (see Table 1) are metered into the initial charge I over the course of approxiamtely 5 minutes.

After a reaction time of 30 minutes the mixtures IV (see Table 1) are metered in over 2 hours and the solutions V (see Table 1) over 4 hours, in the immersed state, to the in situ seed.

Immediately after the end of the streams IV and V, the metered addition of the monomer streams VI (see Table 1) is commenced. These monomer streams VI are likewise metered in over 2 hours.

This is followed by 1 hour of stirring, after which the batch is reactivated with solution VII (see Table 1).

The batch is subsequently stirred for 4 hours, then cooled to room temperature and neutralized with the mixtures VIII (see Table 1). The product is subsequently discharged and filtered through a polyamide cloth having a mesh size of 100 μm.

The dispersions 3–7 have the characteristic physicochemical data listed in Table 1.

TABLE 1

Composition and physicochemical properties of polyol dispersions 3–7

|  | Ex. 3 [g] | Ex. 4 [g] | Ex. 5 [g] | Ex. 6 [g] | Ex. 7 [g] |
|---|---|---|---|---|---|
| Initial charge I: | | | | | |
| Emulgator A* | 5.0 | 4.0 | 2.0 | 1.0 | 1.0 |
| DI water | 720 | 720 | 720 | 720 | 720 |
| Monomer mixture II (in situ seed): | | | | | |
| Hydroxypropyl methacrylate | 8.3 | 8.3 | 8.3 | 8.3 | 8.3 |
| Methyl methacrylate | 30.0 | 30.0 | 30.0 | 30.0 | 30.0 |
| Styrene | 45.0 | 45.0 | 45.0 | 45.0 | 45.0 |
| n-Butyl acrylate | 14.7 | 14.7 | 14.7 | 14.7 | 14.7 |
| Initiator solution III (in situ seed): | | | | | |
| Ammonium peroxodisulphate | 0.3 | 0.3 | 0.3 | 0.3 | 0.3 |
| Deionized water | 17.0 | 17.0 | 17.0 | 17.0 | 17.0 |
| Monomer stream IV (feed): | | | | | |
| Hydroxypropyl methacrylate | 37.4 | 37.4 | 37.4 | 37.4 | 37.4 |
| Methyl methacrylate | 135.1 | 135.1 | 135.1 | 135.1 | 135.1 |
| Styrene | 202.6 | 202.6 | 202.6 | 202.6 | 202.6 |
| n-Butyl acrylate | 65.9 | 65.9 | 65.9 | 65.9 | 65.9 |
| Initiator/emulsifier feed V: | | | | | |
| Ammonium peroxodisulphate | 3.0 | 3.0 | 3.0 | 3.0 | 3.0 |
| Emulgator A* | 20.0 | 21.0 | 23.0 | 24.0 | 24.0 |
| Deionized water | 600 | 600 | 600 | 600 | 600 |
| Monomer stream VI (feed): | | | | | |
| Acrylic acid | 10.0 | 20.0 | 10.0 | 10.0 | 10.0 |
| Hydroxypropyl methacrylate | 123.3 | 123.3 | 123.3 | 123.3 | 123.3 |
| Methyl methacrylate | 34.9 | 24.9 | 34.9 | 34.9 | 34.9 |
| Styrene | 52.4 | 52.4 | 52.4 | 52.4 | 52.4 |
| n-Butyl acrylate | 170.4 | 170.4 | 170.4 | 170.4 | 170.4 |
| Polyether-Desmophen ® 550 U | 50.0 | 50.0 | | | |
| Polyether-Desmophen ® L 400 | | | 50.0 | | |
| Polyether-Desmophen ® 1600 U | | | | 50.0 | |
| Polyether-Desmophen ® 3600 | | | | | 50.0 |
| Re-activator solution VII: | | | | | |
| Ammonium peroxodisulphate | 1.0 | 1.0 | 1.0 | 1.0 | 1.0 |
| Deionized water | 10.0 | 10.0 | 10.0 | 10.0 | 10.0 |
| Neutralizing solution VIII: | | | | | |
| Ammonia (25% strength, aqueous) | 9.4 | 15.0 | 9.4 | 9.4 | 9.4 |
| Deionized water | 10.0 | 10.0 | 10.0 | 10.0 | 10.0 |
| Solids content [% by weight] | 42.1 | 42.3 | 42.1 | 41.8 | 42.0 |
| pH | 8.0 | 7.3 | 7.5 | 7.7 | 7.4 |
| Viscosity (23° C.; D = 45.4 s$^{-1}$) [mPa*s] | 32 | 118 | 20 | 22 | 18 |
| Av. particle diameter (LCS) [nm] | 110 | 125 | 160 | 135 | 136 |
| Acid number [mg KOH/g dispersion] | 7.4 | 11.6 | 6.7 | 7.4 | 7.5 |

*Emulgator A: see comparative example polymer polyol 1
Polyether-Desmophen ® 550 U: Bayer AG, Lev, DE, polypropylene oxide polyol with $M_n$ = 437 g/mol, functionality f = 3
Polyether-Desmophen ® L 400: Bayer AG, Lev, DE, polypropylene oxide polyol with $M_n$ = 561 g/mol, OH number: 200 mg KOH/g RS (f = 2)
Polyether-Desmophen ® 1600 U: Bayer AG, Lev, DE, polypropylene oxide polyol with $M_n$ = 1000 g/mol
Polyether-Desmophen ® 3600: Bayer AG, Lev, DE, polypropylene oxide polyol with $M_n$ = 2000 g/mol, OH number: 56 mg KOH/g RS (f = 2)

Polymer Polyols, Examples 8 and 9 (Inventive)

Addition of Polyether During Neutralization

A 3 l glass reactor with an effective blade stirrer, gas inlet and gas outlet, a reflux condenser and a thermal conditioning apparatus which ensures an isothermal regime is charged with the solutions I (see Table 2) and purged thoroughly with nitrogen. Thereafter, the initial charge I is heated with stirring at approximately 200 rpm to a temperature of 80° C. During this time a continuous stream of nitrogen is maintained above the level of the liquid. Subsequently, the mixtures II and the solutions III (see Table 2) are metered into the initial charge I over the course of approximately 5 minutes.

After a reaction time of 30 minutes the mixtures IV are metered in over 2 hours and the solutions V (see Table 3) over 4 hours, in the immersed state, to the in situ seed.

After the end of the monomer feeds IV, the metered addition of the second monomer streams VI is commenced immediately.

After the simultaneous ending of feeds V and VI, stirring is continued for 1 hour and then reactivation is carried out with the solutions VII (see Table 2). This is followed by stirring for 4 hours, after which the products are cooled to room temperature and neutralized with the mixtures VIII (see Table.2).

The products are discharged and filtered through a polyamide filter having a mesh size of 100 μm.

The dispersions 8 and 9 have the characteristic physicochemical data listed in Table 2.

TABLE 2

Composition and physicochemical properties of polyol dispersions 8 and 9

|  | Ex. 8 [g] | Ex. 9 [g] |
|---|---|---|
| Initial charge I: | | |
| Emulgator A* | 12.5 | 12.5 |
| DI water | 720 | 720 |
| Monomer mixture II (in situ seed): | | |
| Hydroxypropyl methacrylate | 8.3 | 8.3 |
| Methyl methacrylate | 30.0 | 30.0 |
| Styrene | 45.0 | 45.0 |
| n-Butyl acrylate | 14.7 | 14.7 |
| Initiator solution III (in situ seed): | | |
| Ammonium peroxodisulphate | 0.3 | 0.3 |
| Deionized water | 17.0 | 17.0 |
| Monomer stream IV (feed): | | |
| Hydroxypropyl methacrylate | 37.4 | 37.4 |
| Methyl methacrylate | 135.1 | 135.1 |
| Styrene | 202.6 | 202.6 |
| n-Butyl acrylate | 65.9 | 65.9 |
| Initiator/emulsifier stream V (feed): | | |
| Ammonium peroxodisulphate | 3.0 | 3.0 |
| Emulgator A* | 12.5 | 12.5 |
| Deionized water | 600 | 600 |
| Monomer stream VI (feed): | | |
| Acrylic acid | 10.0 | 10.0 |
| Hydroxypropyl methacrylate | 123.3 | 123.3 |
| Methyl methacrylate | 34.9 | 34.9 |
| Styrene | 52.4 | 52.4 |
| n-Butyl acrylate | 70.4 | 20.4 |
| Neutralizing solution VIII: | | |
| Ammonia (25% strength, aqueous) | 9.4 | 9.4 |
| Polyether-Desmophen ® 550 U | 150 | 200 |
| Deionized water | 10 | 10 |
| Solids content [% by weight] | 41.6 | 41.6 |
| pH | 7.0 | 7.1 |
| Viscosity (23° C.; D = 45.4 s$^{-1}$) [mPa*s] | 10 | <100 |

TABLE 2-continued

Composition and physicochemical properties of polyol dispersions 8 and 9

|  | Ex. 8 [g] | Ex. 9 [g] |
|---|---|---|
| Av. particle diameter (LCS) [nm] | 97 | 107 |
| Acid number [mg KOH/g dispersion] | 7.0 | 6.6 |

*emulsifier A: Emulgator 951 emulsifier, Bayer AG, Lev, DE,

Polymer Polyol Ex. 10 (Comparative Example)

Dispersion without Core/Shell Structure

A glass reactor with effective paddle stirrer, gas inlet and gas outlet, a reflux condenser and a thermal conditioning apparatus which ensures an isothermal regime is charged with 25 g of an 80% by weight, aqueous paste of an emulsifier A (ammonium salt of the monoester of a $C_{12-18}$ fatty alcohol polyethylene oxide with a degree of polymerization of approximately 3; Emulgator 951, Bayer AG, Leverkusen, DE) and 690 g of deionized water (solution I). After the mixture has been thoroughly purged with nitrogen, this initial charge is heated to a temperature of 80° C. During this time a continuous stream of nitrogen is maintained above the level of the liquid. Subsequently, mixture II and solution III are metered in over the course of approximately 5 minutes.

| II. | Acrylic acid | 3.0 g |
|---|---|---|
|  | Hydroxypropyl methacrylate | 34.0 g |
|  | Methyl methacrylate | 50.0 g |
|  | n-Butyl acrylate | 10.0 g |
|  | α-Methylstyrene dimer | 1.0 g |
| III. | Ammonium peroxodisulphate | 0.5 g |
|  | Deionized water | 86.0 g |

After a reaction time of 30 minutes, during which a so-called "in situ" seed is produced, mixture IV and solution V are metered in in parallel over 6 hours below the level of the liquid, i.e. in the immersed state.

| IV. | Acrylic acid | 27.0 g |
|---|---|---|
|  | Hydroxypropyl methacrylate | 305.0 g |
|  | Methyl methacrylate | 450.0 g |
|  | n-Butyl acrylate | 81.0 g |
|  | α-Methylstyrene dimer | 19.0 g |
| V. | Ammonium peroxodisulphate | 3.0 g |
|  | Deionized water: | 516.0 g |

Thereafter the mixture is stirred for a further 2 hours and subsequently reactivated with solution VII.

| VI. | Ammonium peroxodisulphate: | 0.5 g |
|---|---|---|
|  | Deionized water: | 86.0 g |

After 4 hours of subsequent stirring the mixture is cooled to room temperature and then neutralized with the mixture VII.

| VII. | Ammonia (25% strength aqueous solution): | 17.0 g |
|---|---|---|
|  | Deionized water: | 20.0 g |

The product is subsequently discharged and filtered.

The physicochemical properties of this dispersion are as follows:

Solids content: 43.9% by weight
pH: 7.0
Viscosity (23° C.; D = 42 s$^{-1}$): 150 mPas
Average particle diameter (LCS): 103 nm
Acid number: 12.0 mg KOH/g dispersion Performance Examples The sources of the components used can be found in the manufacturer listing

TABLE 3

Film-forming binders for transparent sealing with the polyol dispersions according to Example 1 (comparative), 2 (inventive) and 10 (comparative)

| Ingredient | | Composition in parts by weight | | | | | |
|---|---|---|---|---|---|---|---|
| Component I: | | | | | | | |
| Polyol dispersion from Ex. 1 | | 58.34 | 58.34 | 58.34 | — | — | |
| Polyol dispersion from Ex. 2 | | — | — | — | 50.00 | 50.00 | |
| Polyol dispersion from Ex. 10 | | | | | | | 58.34 |
| Acrysol ®RM 8 (5% in water) | (1) | 2.33 | 2.33 | 2.33 | 2.00 | 2.00 | 2.33 |
| Foamaster ® 306 | (2) | 0.47 | 0.47 | 0.47 | 1.00 | 1.00 | 0.47 |
| Baysilone ® coatings additive 3466 (10% in water) | (3) | 5.83 | 5.83 | 5.83 | 3.00 | 3.00 | 5.83 |
| Demineralized water | | 11.67 | 11.67 | 11.67 | 12.00 | 12.00 | 11.67 |
| Methylpropyl acetate | | — | 4.67 | 4.67 | — | — | 4.67 |

TABLE 3-continued

Film-forming binders for transparent sealing with the polyol dispersions according to Example 1 (comparative), 2 (inventive) and 10 (comparative)

| Ingredient | Composition in parts by weight | | | | | |
|---|---|---|---|---|---|---|
| Component 2: | | | | | | |
| Polyisocyanate 1 | — | 12.02 | — | 10.00 | — | |
| Polyisocyanate 2 | 10.07 | — | 10.07 | — | 8.6 | 20.39 |
| Composition (in % by weight): | | | | | | |
| Binder | 39.0 | 38.3 | 37.0 | 39.6 | 38.5 | 42.6 |
| Water content | 59.7 | 55.6 | 56.8 | 58.6 | 59.7 | 51.8 |
| Solvent content | — | 4.9 | 5.0 | — | — | 4.5 |
| Additive | 1.3 | 1.1 | 1.1 | 1.7 | 1.7 | 1.0 |
| Assessment criteria | | | | | | |
| Coating material solvent-free? | yes | no | no | yes | yes | no |
| Film optical properties/compatibility | not OK | OK | OK | OK | OK | not OK |
| Water resistance | not OK** | n.d.** | OK | n.d.** | OK | not OK |

*film heterogeneous, full of gel specks
**not determined

The polyol dispersions 1, 2 and 10 are charged to a dissolver and the additives described in Table 3 plus the demineralized water are dispersed at approximately 5 m/s for about 15 minutes. This gives a dispersion batch of virtually unlimited storage stability.

a) In the case of the polyol dispersions from Examples 1 and 10, it is also necessary to added methylpropyl acetate, to allow mixing by hand with polyisocyanate 1 or 2. Without the addition of the cosolvent a heterogeneous film is obtained which is strewn with gel specks.
  Addition of polyisocyanate 1 or 2 gives a transparent, water-thinnable two-component polyurethane coating material with a composition as described in Table 3. The ready-to-use batches contain about 5% by weight of solvent. The working time is approximately 1 hour at 23° C.

b) In the case of the polyol dispersion of Example 2, the polyisocyanate 1 or 2 can be mixed in by hand. There is no need to add any organic cosolvent. A transparent, water-thinnable two-component polyurethane coating material is obtained with a composition as described in Table 3. The working time is approximately 1 hour at 23° C.

TABLE 4

Matt, transparent seals with polyol dispersions from Examples 3, 4, 5, 6 and 7

| Ingredient | Composition in parts by weight | | | | |
|---|---|---|---|---|---|
| Component I: | | | | | |
| Polyol dispersion from Ex. 3 | 59.5 | — | — | — | — |
| Polyol dispersion from Ex. 4 | — | 59.5 | — | — | — |
| Polyol dispersion from Ex. 5 | — | — | 59.5 | — | — |
| Polyol dispersion from Ex. 6 | — | — | — | 59.5 | — |
| Polyol dispersion from Ex. 7 | — | — | — | — | 59.5 |
| Drewplus ® T-4201 (4) | 1.0 | 1.0 | 1.0 | 1.0 | 1.0 |
| Hydropalat ® 140 (2) | 0.7 | 0.7 | 0.7 | 0.7 | 0.7 |
| Ultralube ® D-818 (5) | 4.8 | 4.8 | 4.8 | 4.8 | 4.8 |
| Water (demineralized) | — | — | 26.8 | 26.8 | 26.8 |
| Deuteron ® MK (6) | 4.9 | 4.9 | — | — | — |
| Ceraflour ® 920 (7) | — | — | 4.4 | 4.4 | 4.4 |
| Acrysol ® RM 8( 5% in H$_2$O) (1) | 2.4 | 2.4 | 1.2 | 1.2 | 1.2 |
| Component 2: | | | | | |
| Polyisocyanate 3 | 7.5 | 7.5 | 10.0 | 10.0 | 10.0 |
| Composition (in % by weight) | | | | | |
| Binder | 40.3 | 40.4 | 32.3 | 31.9 | 32.3 |
| Solids content | 52.4 | 52.6 | 40.9 | 40.4 | 40.8 |
| Water content | 45.5 | 45.3 | 57.6 | 58.0 | 57.6 |
| Additives | 2.1 | 2.1 | 1.6 | 1.6 | 1.6 |

TABLE 4-continued

Matt, transparent seals with polyol dispersions from Examples 3, 4, 5, 6 and 7

| Ingredient | Composition in parts by weight | | | | |
|---|---|---|---|---|---|
| Characteristic data: | | | | | |
| Drying time (dry to touch) (at RT in minutes) | 360 | 360 | — | — | — |
| Taber abrasion in mg (CS 10/1000 revolutions) | — | — | 46 | 53 | 52 |
| Gloss (85°) | 12.4 | 14.1 | 15.2 | 14.3 | 15.4 |
| König pendulum hardness: (after curing at RT for 14 d) | 86 s | 84 s | 79 s | 73 s | 76 s |
| Chemical resistance: (in accordance with DIN 68861 Part B) | | | | | |
| Ethanol [1 h] | OK | OK | OK | OK | OK |
| Water [9 d] | OK | OK | OK | OK | OK |
| Cosolvent content of coating material | <<1% | <<1% | <<1% | <<1% | <<1% |

The polyol dispersions (from Examples 3, 4, 5, 6 and 7) are charged to a dissolver and the additives described in Table 4 plus the demineralized water are dispersed at approximately 5 m/s for about 15 minutes. This gives a dispersion batch of virtually unlimited storage stability.

The coating materials were applied in a wet film thickness from 100 to 800 μm (corresponding to a dry film thickness of from 40 to 320 μm) and dry within 10 to 20 minutes to form tack-free films. The curing process is absolutely complete after from 7 to 14 days.

The characteristic data compiled in Table 4 are measured for the mechanical and chemical properties of the coating films.

TABLE 5

Film-forming binders for transparent seals with the polyol dispersions from Examples 8 and 9

| Ingredient | Composition in parts by weight | |
|---|---|---|
| Component 1: | | |
| Polyol dispersion from Ex. 8 | 50.0 | — |
| Polyol dispersion from Ex. 9 | — | 50.0 |
| (1) Acryso ® RM 8 (5% in H₂O) | 1.5 | 2.0 |
| (8) Byk ® 025 | 0.7 | 0.7 |
| (8) Byk ® 348 | 0.2 | 0.2 |
| (8) Byk ® 380 | 0.3 | 0.3 |
| Water (demineralized) | 15.0 | 15.0 |
| (6) Deuteron ® MK | 4.0 | — |
| Component 2: | | |
| Polyisocyanate 3 | 8.6 | 8.5 |
| (9) Worlee Add ® 575 (10% in MPA) | 0.2 | — |
| Composition (in % by weight): | | |
| Binder | 36.5 | 38.2 |
| Solids content | 41.6 | 38.3 |
| Water content | 56.7 | 60.1 |
| Additives | 1.7 | 1.6 |
| Characteristic data: | | |
| König pendulum hardness (after curing at RT for 14 d) | 99 s | 30 s |
| Cosolvent content of the coating material | <<1% | <<1% |

The polyol dispersions (from Examples 8 and 9) are charged to a dissolver and the additives described in Table 5 plus the demineralized water are dispersed at approximately 5 m/s for about 15 minutes. This gives a dispersion batch of virtually unlimited storage stability.

The coating materials were applied in a wet film thickness from 100 to 240 μm (corresponding to a dry film thickness of from 40 to 96 μm) and dry within 10 to 20 minutes to form tack-free films. The curing process is entirely complete after from 7 to 14 days.

The characteristic data compiled in Table 5 are measured for the mechanical properties of the coating films.

Manufacturer index:

(1) Acrysol ® RM 8
Rheological additive
Rohm & Haas Company
100 Independence Mall West, Philadelphia, PA 19106-2399, USA
Tel.: 001-215-592-3000 Fax: 001-215-592-3377
www.rohmhaas.com (2) Foamaster ® 306, Hydropalat 140
Devolatilizing additive, levelling additive
Cognis GmbH
Henkelstraβe 67, 40589 Dusseldorf, Germany
Tel.: 0049(0)211-79400 Fax: 0049(0)211-7988567
www.cognis.com (3) Baysilone ® coatings additive 3466
Levelling additive
Borchers GmbH
Alfred-Nobel-Straβe 50, 40765 Monheim, Germany
Tel.: 0049(0)2173-382500 Fax: 0049(0)2173-382699

(4) Drewplus ® T-4201
Devolatilizing additive
Ashland Chemical
One Drew Plaza, Boonton, N.J. 07005, USA
Tel.: 001-973-2637600 Fax: 001-973-2633323
www.ashland.com (5) Ultralube ® D-818/D-865
Wax
Keim Additec
Postfach 12 04, 55478 Kirchberg/Hunsrück, Germany
Tel.: 0049(0)6763-93330 Fax: 0049(0)6763-933330
www.keim-additec.de (6) Ceraflour ® 920
Dulling agent
Byk Chemie -continued Abelstraβe 45, Postfach 100245, 46462 Wesel, Germany
Tel.: 0049(0)281-6700 Fax: 0049(0)281-65735
www.byk-chemie.com
(7) Deuteron ® MK
Dulling agent
DEUTERON GmbH
In den Ellern 2, D-28832 Achim, Germany
Tel.: 0049(0)421-483227 Fax: 0049(0)421-483602
www.deuteron.com
(8) Byk ® 025, Byk ® 380
Devolatilizers, wetting additive, levelling additive
Byk Chemie
Abelstraβe 45, Postfach 100245, 46462 Wesel, Germany
Tel.: 0049(0)281-6700 Fax: 0049(0)281-65735
www.byk-chemie.com
(9) Worlee Add ® 575
Catalyst
Worlee-Chemie GmbH
Grusonstr. 22, 22113 Hamburg, Germany
Tel. 0049(0)40-73333-0 Fax: 0049(0)40-73333-296
worlee-chemie@ch.worlee.de Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing aqueous two-component polyurethane systems, comprising i) preparing a polyol component a) composed of a hydrophobic core polymer having a glass transition temperature of 40° to 100° C., on which a hydrophilic shell polymer having a glass transition temperature of from −100° to +25° C. has been grafted by aqueous-phase emulsion polymerization, ii) adding a hydroxyl-containing polyether component b) before, during or after the polymerization and iii) admixing a polyisocyanate component c) therewith.

2. The process of claim 1, wherein no cosolvent is used.

3. The process of claim 1, wherein said polyol component a) is prepared from
   A) from 0 to 7% by weight of a monomer selected from the group consisting of acrylic acid, methacrylic acid, and mixtures thereof,
   B) from 5 to 75% by weight of a monomer selected from the group consisting of methyl methacrylate, styrene, and mixtures thereof
   C) from 3 to 40% by weight of a monomer selected from the group consisting of $C_{1-8}$ alkyl acrylates, $C_{2-8}$ alkyl methacrylates, and mixtures thereof,
   D) from 2 to 74% by weight of a monomer selected from the group consisting of monohydroxy-functional alkyl acrylates, monohydroxy-functional alkyl methacrylates, and mixtures thereof,
   E) from 0 to 30% by weight of other olefinically unsaturated monomers, the sum of the components being 100% by weight.

4. The process of claim 1, wherein the polyether component b) comprises a polypropylene oxide polyol having a molecular weight of from 300 to 4000 g/mol.

5. The process of claim 1, wherein the polyisocyanate component c) has a viscosity of from 5 to 12 000 mPas.

6. The process according of claim 1, wherein components a), b) and c) are mixed manually or by the action of a stirrer, the proportions being chosen so as to give an NCO/OH equivalents ratio of from 0.2:1 to 5:1.

7. The aqueous two-component polyurethane system produced by the process of claim 6.

8. A coating composition comprising the aqueous two-component polyurethane system of claim 7.

9. The coating composition of claim 8, further comprising an organic cosolvent in an amount of less than 2% by weight.

10. A process for producing coated substrates, comprising applying the composition of claim 7 to a substrate.

11. The coated substrate produced according to claim 10

* * * * *